United States Patent [19]

Barkman et al.

[11] 4,090,011
[45] May 16, 1978

[54] ARMOR

[75] Inventors: Erick F. Barkman, Henrico County; John Harry Jackson, Richmond; Bennie Ray Ward, Jr., Chesterfield County, all of Va.

[73] Assignee: Reynolds Metals Company, Richmond, Va.

[21] Appl. No.: 380,088

[22] Filed: Jul. 2, 1964

[51] Int. Cl.$^2$ ............................................. B22F 3/00
[52] U.S. Cl. .................................. 428/653; 428/911; 109/49.5
[58] Field of Search ................... 29/197, 196.2, 182.2; 2/2.5; 109/49.5; 161/404; 428/653, 911

[56] References Cited

U.S. PATENT DOCUMENTS

| | | | |
|---|---|---|---|
| 2,052,684 | 9/1936 | Wisbrod | 161/404 |
| 2,279,110 | 4/1942 | Collins | 161/404 |
| 2,735,170 | 2/1956 | Moffatt | 29/197 |
| 2,809,422 | 10/1957 | Schultz | 29/197 |
| 2,908,073 | 10/1959 | Dulin | 29/197 |
| 3,010,190 | 11/1961 | Russell | 29/197 |
| 3,210,840 | 10/1965 | Ulam | 29/196.2 |

*Primary Examiner*—Brooks H. Hunt
*Attorney, Agent, or Firm*—Glenn, Lyne, Gibbs & Clark

EXEMPLARY CLAIM

1. Armor possessing high resistance to penetration, comprising a metallic composite having a layer of aluminous metal bonded to a layer of a precipitation-hardenable ferrous alloy, said composite in bonded condition being susceptible to a thermal hardening treatment to increase the strength of said ferrous alloy layer.

24 Claims, No Drawings

ARMOR

This invention relates to novel armor materials having both ferrous and aluminous metal components. More particularly, the invention concerns armor comprising bonded composites of heat-treatable aluminum base alloys and precipitation-hardenable stainless steels of the semiaustenitic type, which composites possess high resistance to ballistic penetration.

Various composites of aluminum or aluminum alloys and ferrous metals, such as stainless steels, have found limited application in highway trailer and tank-car bodies, railway rolling stock, automotive trim, cooking utensils, shielding panels and members.

In accordance with the present invention there are provided novel armor materials formed of bonded composites of aluminum base alloys and precipitation-hardenable ferrous alloys, which composites exhibit superior energy absorbing properties and excellent resistance to denting and penetration under impact loading, particularly in relation to their low-areal densities. These armor materials thus are well-suited for use in making personnel protective gear such as body armor, helmets and the like.

Aluminum base alloys which may be advantageously employed in accordance with the invention include heat-treatable wrought alloys of the aluminum-copper or the aluminum-zinc-magnesium types, such as copper-bearing alloys 2014, 2017, 2024, and 2025, ranging in copper content from about 3.5% to about 5.0%, and zinc-bearing alloys such as 7075 and 7002, the strength of which is increased by solution heat treatment (810°–990° F.) followed by quenching.

The aluminum base alloys may also be used when clad on at least one side with aluminum, for example alclad 2024 with a 2.5% or a 5% cladding.

Ferrous alloys which are advantageously employed in the composites of the invention include the heat treatable alloys of iron with chromium and nickel, or with nickel itself as the major alloying ingredient. Thus, there may be employed annealed conventional stainless steels of the 18 Cr-8 Ni type, designated as 302 and 304, or iron-nickel alloys containing about 8% to 10% nickel. The stainless steels may be used in the form of sheet or of mesh.

In accordance with the invention, it has been found that composites which include the precipitation hardenable stainless steels of the semiaustenitic type provide superior properties of penetration resistance. These stainless steels are particularly adapted to bonding with aluminum alloys which are responsive to thermal treatment within approximately the same temperature range as the stainless steels themselves. Examples of precipitation hardenable stainless steels of the semiaustenitic type are the grades available commercially under the designations 17-7 PH and PH 15-7 Mo (Armco Steel Corp., Middletown, Ohio). Stainless 17-7 PH contains 17% chromium, 7% nickel plus 1% aluminum to effect its precipitation hardening ability. The alloy is austenitic in the annealed condition, but is martensitic in the hardened condition. Alloy PH 15-7 Mo is similar to 17-7 PH but with 2% molybdenum replacing 2% of the chromium, resulting in improved elevated temperature properties. Both of these steels are susceptible to a thermal hardening treatment which may produce ultimate strengths up to 240,000 p.s.i. The alloys are available as sheet in the cold rolled or cold drawn condition (Condition C), which when subsequently aged at about 900° F., develop high strength levels.

Typical analyses include

|  | (% by weight) | |
| --- | --- | --- |
|  | 17-7 PH | PH 15-7 Mo |
| Chromium | 16.0–18.0 | 14.0–16.0 |
| Nickel | 6.50–7.75 | 6.50–7.75 |
| Aluminum | 0.75–1.50 | 0.75–1.50 |
| Molybdenum | — | 2.0–3.0 |
| Carbon | 0.09 max. | 0.09 max. |
| Manganese | 1.00 max. | 1.60 max. |
| Sulfur | 0.03 max. | 0.03 max. |
| Silicon | 1.00 max. | 1.00 max. |
| Iron | Balance | Balance |

In the preparation of the composites of the invention, the sheets of aluminum and of stainless steel may be of any desired thickness compatible with good bonding, varying from foil gages up to the limit of the processing equipment. Preferred aluminum alloy gages vary, for example, from 0.040 inch to 0.125 inch, while suitable stainless steel gages may range from 0.004 inch to 0.016 inch, all before bonding. These gage ranges are to be considered as illustrative, however, and not as limiting.

The composites of the invention may be bonded by rolling or by means of suitable adhesives, but rolling is preferred. Bonding is advantageously performed by a rolling operation in which the stainless steel or ferrous alloy sheet is maintained substantially at room temperature. The aluminum alloy is preheated to a temperature between about 650° F. and about 1000° F., depending upon the alloy employed, care being taken to avoid grain boundary melting. A temperature range between about 850° and about 950° F ordinarily is preferred. The time of preheat may vary according to conditions, but generally a period of from 5 to 15 minutes is sufficient to uniformly heat the aluminum to the desired temperature. The time of preheat should, however, be kept to a minimum because of surface oxidation.

The metal-to-metal composites of the invention may be of the binary type, i.e. a single layer of aluminum alloy bonded to a single layer of ferrous alloy, or they may be of the sandwich type, such as a layer of aluminum alloy between two layers of stainless steel. Where alclad alloy is used, the steel is preferably bonded to the aluminum cladding layer. Also included within the scope of the invention are composites having adjacent multiple thicknesses of one or both of the ferrous and aluminous metal components.

There may also be included in the composite a layer of a plastic material capable of high elongation, for example, a layer of polyester, such as polyethylene terephthalate (Mylar), or of polypropylene, preferably biaxially oriented, or a composite of aluminum foil and plastic film, or a layer of a linear polyamide (nylon), preferably in the form of felt or woven fiber.

The composites may be bonded, particularly where a plastic layer is included, with a suitable adhesive, instead of being rolled. An example of such an adhesive is a mixture of 55% by weight of an epoxy resin (Armco No. 1009), and 45% by weight of a polysulfide polymer (Thiokol) obtained by the reaction of an alkali metal polysulfide with an organic dichloride.

In preparing the composites of the invention, the surface of the aluminum or aluminum base alloy is degreased, and is then roughened by wire brushing, sanding, grinding, or like methods, in order to remove any film or thin layer of aluminum oxide which would interfere with bonding. If desired, a chemical dip may also be employed. Similarly, the ferrous alloy is subjected to roughening by brushing, or grinding, to break up the oxide layer.

As mentioned previously, bonding may be by means of an adhesive or by rolling. Where rolling is used, the production of a bond may be effected with a reduction in the thickness of the aluminum alloy sheet from about 30% to about 70%, and in the stainless steel sheet from about 10% to about 50%. Rolling is carried out in conventional equipment, an overall gage reduction of about 50% resulting in satisfactory bonding.

After bonding, the composite is subjected, in accordance with the invention, to a thermal treatment by reheating the bonded composite to a temperature between about 850° F. and about 950° F. for a period of from about 15 mintues to about 1 hour. The temperature is selected according to the particular alloys involved. Thus, for example, alloy 2024 requires treatment at about 920° F., while alloy 7075 is heated at about 880° F. Followed by a cold water quench, such thermal treatment placed the aluminum in T-4 temper condition, while if followed by a cold water quench and precipitation hardening (aging) it places the aluminum in T-6 temper condition. The treatment also accomplishes a hardening of the stainless steel, particularly if the steel used is in the aforementioned Condition C, thus completing the treatment of both the aluminum alloy and the steel.

With regard to resistance to penetration, the composites of the invention appear to exhibit a potentiating or synergistic effect, in that the resistance to penetration of the composite is greater then would be expected from the cumulative effect of the individual layers.

The following examples serve to illustrate the practice of the invention, but are not to be considered as limiting:

EXAMPLE 1

A composite was prepared from a sheet of annealed alclad 2024 alloy, clad on one side with aluminum, dimensions 10 inches × 16 inches × 0.080 inches, and a sheet of annealed stainless steel 17–7 PH, dimensions 12 inches × 16 inches × 0.016 inches. Prior to bonding, both pieces were wire brushed on the side to be bonded. The 2024 sheet was heated for 10 minutes at 900° F., and the 17–7 PH sheet was maintained at room temperature. The sheets were bonded by rolling in a 4-high mill having work rolls 8½ inches in diameter, back-up rolls 16 inches, width 18 inches, using a mil setting of −0.015 inches (negative roll gap). The resulting 0.049 inch composite was heat treated at 920° F. for 20 minutes and then quenched in cold water.

The composite exhibited longitudinally a tensile strength of 91,900 psi., a yield strength of 73,600 psi, an elongation in 2 inches of 10.0%, and a modulus of elasticity of 13.0 × $10^6$; transversely, the values were: tensile strength 88,900 psi., yield strength 64,300 psi., elongation 11.5%, modulus of elasticity 13.0 × $10^6$.

EXAMPLE 2

Proceeding as in Example 1, a composite was prepared from a sheet of annealed alclad 2024 alloy, dimensions 10 inches × 16 inches × 0.080 inches, and a sheet of annealed 17–7 PH stainless steel, dimensions 12 inches × 16 inches × 0.008 inches. Both pieces were wire brushed on one side before bonding. Prior to bonding the 2024 sheet was heated to 900° F. for 10 minutes, while the steel was kept at room temperature. Bonding was performed at a mil setting of 0.000 inch (zero roll gap). The composite (0.053 inch) was heat treated at 920° F. for 20 minutes and then quenched in cold water.

The composite exhibited longitudinally a tensile strength of 58,100 psi., a yield strength of 33,600 psi, an elongation of 17.7% in 2 inches, and a modulus of elasticity of 12.0 × $10^6$; transversely the values were: tensile strength 58,100 psi, yield strength 32,000 psi, elongation 18.2%, same modulus.

EXAMPLE 3

Proceeding as in Example 1, a sandwich composite was prepared from two sheets of annealed alclad 2024 alloy, dimensions 10 inches × 16 inches × 0.040 inch, with an intermediate sheet of fully annealed stainless steel 17–7 PH, dimensions 12 inches × 16 inches × 0.008 inch, bonding being on the sides of the 2024 alloy having aluminum cladding. Both materials were wire brushed before bonding. Alloy 2024 pieces were heated for 10 minutes at 900° F., while the steel was kept a room temperature. The roll bonding was carried out at a mill setting of 0.000 inch (zero roll gap). The composite (.052 inch) was heat treated at 920° F. for 20 minutes and quenched in cold water.

The composite exhibited longitudinal tensile strength of 69,500 psi, yield strength of 51,900 psi, elongation of 13.5%, and modulus of elasticity of 11.9 × $10^6$.

EXAMPLE 4

Proceeding as in Example 1, a composite was prepared by rolling a sheet of alclad 2024 alloy to a thickness of 0.080 inch, annealing for 650° F. for 30 minutes, wire brushing the clad face of the 2024 sheet and a 0.004 inch thick sheet of stainless steel PH 15–7 Mo ("full hard" treated), heating the 2024 piece for 10 minutes at 850° F., keeping the steel at room temperature, bonding the sheets by rolling (0.020 roll gap) into a composite of thickness 0.065 inch, at 920° F. for 20 minutes, and finally quenching in cold water.

EXAMPLE 5

Proceeding as in Example 4, a composite was prepared employing 0.080 inch alclad 2024 alloy and a sheet of 0.016 inch thickness stainless steel PH 15–7 Mo full hard. Satisfactory results were obtained using a mill setting of −0.005 to produce a bonded composite of 0.059 inch thickness.

EXAMPLE 6

Proceeding as in Example 3, a composite sandwich was prepared from a core piece of 7075 aluminum alloy and two pieces of stainless steel 17–7PH.

EXAMPLE 7

Proceeding as in Example 1, a sheet of alclad 2024 alloy was rolled to 0.125 inch thickness, annealed, and bonded to a piece of stainless steel 17–7 PH thickness 0.016 inch, the materials being rolled (mill setting of 0.020) to a thickness of 0.090 inch. The composite was heat treated and then rolled further to a final thickness of 0.065 inch.

EXAMPLE 8

Proceeding as in Example 7, another composite of aluminum alloy and stainless steel was produced by rolling (mill setting of −0.015) directly to a composite thickness of 0.065 inch, followed by heat treatment.

EXAMPLE 9

A composite was prepared as in Example 1, by joining a sheet of alclad 2024 alloy, thickness 0.080 inch, which was wire brushed, to a piece of fine stainless steel 304 mesh which had been previously etched with caustic soda, by rolling (0.020 gap setting) to a total thickness of 0.065 inch, followed by solution heat treatment of the aluminum alloy component.

EXAMPLE 10

A composite was prepared from a sheet of 0.001 inch foil (1235 alloy) and a sheet of biaxially oriented polypropylene (0.001 inch) on each side thereof, employing as an adhesive an intermediate coating of a mixture of 55% of an epoxy resin and 45% of polysulfide polymer, by heating in a press for 30 minutes at 350° F. under pressure. This material was puncture tested at high speeds and compared to the unlaminated foil. Each group was tested in multiples of 10 and 20 layers adhesively bonded together as indicated. The following peak loads were found:

| No. of Layers | Test Speed inches/min | PEAK LOAD LBS. Foil | PEAK LOAD LBS. Polypropylene-Foil |
| --- | --- | --- | --- |
| 10 | 20 | 42.4 | 304 |
| 10 | 7,500 | 69.5 | 457 |
| 20 | 20 | 83.2 | 618 |
| 20 | 7,500 | 13.9 | 778 |

EXAMPLE 11

Composite materials were produced by adhesively joining layers of ballistic nylon fabric onto the aluminum side of metal composites according to Examples 1, 2 and 3.

The following ballistic results were obtained for these materials, as indicated in the following table, compared to reference materials such as titanium body armor and bare 2024-T4 aluminum alloy

| Material Description | Layers of Nylon | Areal Density oz/ft$^2$ | Ballistic Limit feet/second |
| --- | --- | --- | --- |
| | | | (a) Projectile: 0.85 grain hard steel sphere |
| Example 1 Composite | 4 | 18 | 2067 |
| Example 2 Composite | 2 | 16 | 1949 |
| Example 3 Composite | 2 | 16 | 1929 |
| Type I Titanium Composite Vest* | | 19 | 1903 |
| | | | (b) Projectile: Fragment simulator |
| Example 1 Composite | 4 | 18 | 1064 |
| Example 2 Composite | 2 | 16 | 843 |
| Example 3 Composite | 2 | 16 | 782 |
| Bare 2024-T4 | — | 20 | 699 |

Note:
*This vest is composed of one layer of 13 oz/yd$^2$ ballistic nylon as a front cover backed by one thickness of .032" titanium and three layers of the nylon. The titanium type is 5 Al-2.5 Sn (A110-AT).

While present preferred embodiments of the invention have been described, it will be recognized that the invention may be otherwise variously embodied and practiced within the scope of the following claims.

What is claimed is

1. Armor possessing high resistance to penetration, comprising a metallic composite having a layer of aluminous metal bonded to a layer of a precipitation-hardenable ferrous alloy, said composite in bonded condition being susceptible to a thermal hardening treatment to increase the strength of said ferrous alloy layer.

2. Armor possessing high resistance to penetration, comprising a metallic composite having a layer of a ferrous alloy bonded to a layer of a heat-treatable aluminum base alloy, said composite in bonded condition being susceptible to a thermal hardening treatment to increase the strength of said aluminum alloy layer.

3. Armor possessing high resistance to penetration, comprising a metallic composite having a layer of a heat-treatable wrought aluminum base alloy bonded to a layer of stainless steel of the semi-austenitic type, said composite in bonded condition being susceptible to a thermal hardening treatment to increase the strength of both said alloy layers.

4. Armor possessing high resistance to penetration, comprising a metallic composite having a layer of a heat-treatable wrought aluminum base alloy bonded to a layer of a precipitation-hardenable stainless steel of the semi-austenitic type, said stainless steel layer of the bonded composite being susceptible to a thermal hardening treatment in the temperature range for solution heat treatment of said aluminum base alloy.

5. Armor possessing high resistance to penetration, comprising a metallic composite having a layer of a heat-treatable copper bearing aluminum base alloy bonded to a layer of a precipitation-hardenable stainless steel alloy containing approximately 17% chromium, 7% nickel and 1% aluminum, balance substantially iron; said composite in bonded condition being susceptible to a thermal hardening treatment to increase the strength of both said layers.

6. Armor possessing high resistance to pentration, comprising a metallic composite having a layer of a heat-treatable zinc bearing aluminum base alloy bonded to a layer of a precipitation-hardenable stainless steel containing approximately 17% chromium, 7% nickel, and 1% aluminum, balance substantially iron; said composite in bonded condition being susceptible to a thermal hardening treatment to increase the strength of both said layers.

7. Armor possessing high resistance to penetration, comprising a metallic composite having a layer of a heat-treatable copper bearing aluminum base alloy bonded to a layer of a precipitation-hardenable stainless steel containing approximately 15% chromium, 7% nickel, 1% aluminum, and 2% molybdenum, balance substantially iron; said composite in bonded condition being susceptible to a thermal hardening treatment to increase the strength of both said layers.

8. Armor possessing high resistance to penetration, comprising a metallic composite having a layer of heat-treatable zinc bearing aluminum base alloy bonded to a layer of a precipitation hardenable stainless steel containing approximately 15% chromium, 7% nickel, 1% aluminum, and 2% molybdenum, balance substantially iron; said composite in bonded condition being susceptible to a thermal hardening treatment to increase the strength of both said layers.

9. Armor possessing high resistance to penetration, comprising a metallic composite having a layer of a heat-treatable wrought aluminum base alloy adhesively bonded to a layer of a precipitation-hardenable stainless steel of the semi-austenitic type characterized by responsiveness to a thermal hardening treatment in the temperature range for solution heat treatment of said aluminum base alloy.

10. The Armor of claim 4 in which the aluminum base alloy is alloy 2024.

11. The Armor of claim 4 in which the aluminum base alloy is alloy 7075.

12. The Armor of claim 4 comprising a central core of aluminum base alloy bonded to two outer layers of stainless steel.

13. The Armor of claim 3 in which the aluminum base alloy carries an aluminum cladding on its bonded face.

14. The Armor of claim 2 in which the ferrous alloy layer consists of stainless steel mesh.

15. The Armor of claim 1 in which said composite further comprises a layer of plastic material capable of high elongation.

16. Armor according to claim 15, wherein said plastic material is adhered to the aluminous metal layer.

17. Armor having low areal density and high resistance to penetration comprising a bonded composite having a layer of precipitation-hardenable ferrous alloy which is responsive to a thermal hardening treatment in the temperature range from about 850° F. to about 950° F., and a layer of of an aluminum base alloy which is susceptible to solution heat treatment in said temperature range.

18. The Armor of claim 17, in which said composite includes a layer of said ferrous alloy constituting an outer layer of the armor.

19. The Armor of claim 17, comprising a layer of ferrous alloy adjoining a layer of said aluminum base alloy of substantially greater thickness.

20. Armor according to claim 18, wherein a layer of plastic material capable of high elongation provides the opposite outer layer of the armor.

21. The Armor of claim 5, in which said composite includes a layer of aluminum base alloy 2024 bonded to said layer of 17-7 Ph stainless steel.

22. The Armor of claim 6, in which said composite includes a layer of aluminum base alloy 7075 bonded to said layer of 17-7 PH stainless steel.

23. The Armor of claim 7, in which said composite includes a layer of aluminum base alloy 2024 bonded to said layer of PH 15-7 Mo stainless steel.

24. The Armor of claim 8, in which said composite includes a layer of aluminum base alloy 7075 bonded to said layer of PH 15-7 Mo stainless steel.

* * * * *